United States Patent [19]

Gat-Liquornik et al.

[11] Patent Number: 4,928,870
[45] Date of Patent: May 29, 1990

[54] PROCESS FOR JOINING CERAMIC PARTS WITH A REACTIVE CONDUCTING MATERIAL

[75] Inventors: Martin Gat-Liquornik; Aristides Naoumidis, both of Julich, Fed. Rep. of Germany

[73] Assignee: Kernforschungsanlage Julich Gesellschaft mit beschränkter Haftung, Julich, Fed. Rep. of Germany

[21] Appl. No.: 362,274

[22] Filed: Jun. 6, 1989

[30] Foreign Application Priority Data

Jun. 16, 1988 [DE] Fed. Rep. of Germany ....... 3820459

[51] Int. Cl.$^5$ ...................... B23K 11/00; B23K 11/16
[52] U.S. Cl. .................... 228/107; 228/121; 228/242; 228/246; 228/250; 228/231; 219/85.15
[58] Field of Search ............... 228/107, 121, 233, 242, 228/246, 250, 231, 194, 263.12; 219/85.14, 85.15

[56] References Cited

U.S. PATENT DOCUMENTS 4,762,269  8/1988  Gyarmati et al. ................... 228/194

FOREIGN PATENT DOCUMENTS

| 209672  | 1/1987 | European Pat. Off. ............ 228/194 |
| 1571297 | 3/1966 | Fed. Rep. of Germany ...... 228/194 |
| 3003186 | 1/1983 | Fed. Rep. of Germany ...... 228/194 |
| 3011907 | 3/1985 | Fed. Rep. of Germany ...... 228/194 |
| 623240  | 9/1978 | U.S.S.R. ........................... 219/85.15 |

*Primary Examiner*—Richard K. Seidel
*Assistant Examiner*—Samuel M. Heinrich
*Attorney, Agent, or Firm*—Frishauf, Holtz, Goodman & Woodward

[57] ABSTRACT

A thin metal foil or an array of fine wires or a graphite web, mat or the like, having electrical conductivity was interposed between clean polished surfaces of ceramic parts which are to be joined, with application of pressure. A high current electrical discharge with very short duration puts so much energy into the conducting material that it explosively vaporizes and penetrates interacts with the ceramic before the ceramic can absorb an appreciable amount of heat and before the hot material can undesirably react with the surrounding atmosphere, so that an inert atmosphere is not necessary for the process. Metals that form silicides and/or carbides are for e.g. desirable for connecting SiC parts and conducting forms of carbon such as graphite are also suitable. Precoating the surfaces to be joined, with reactive or reaction-promoting material as well as a thermal treatment of the joint may be favorable.

11 Claims, 1 Drawing Sheet

PROCESS FOR JOINING CERAMIC PARTS WITH A REACTIVE CONDUCTING MATERIAL

This invention concerns a process for joining ceramic parts in which a reactive material that conducts electric current, such as graphite or a metal, is interposed in a thin layer between clean and ground or polished surfaces of respective ceramic parts at which those parts are to be joined, with heating up of the joint seam region to a bonding temperature.

Ceramic materials are of interest for many purposes because of their stability and strength at high temperature, but shaping processes for them have only limited applicability because of the generally high hardnesses of these materials. For this reason and because of the difficulty producing larger work pieces, processes for bonding ceramic parts together are of particular importance.

Joining methods are known in which the fitting surfaces are joined together under high pressure at high temperature for a certain period of time in a kind of hot pressing process with the interposition of more or less thick layers of other material, especially reactive material (i.e. carbide and/or silicide forming materials for bonding silicon carbide parts).

The pressures and temperatures used in the known processes require expensive equipment which, in addition, usually must be operated with an inert gas atmosphere for useful results.

SUMMARY OF THE INVENTION

It is an object of the present invention to provide a process for joining ceramic parts which can be carried out in a much simpler and economical way.

Briefly, the heating up to bonding temperature is produced in the practice of this invention by impact of an electric current shock pulse on electrically conductive material interposed in the joint for such a short period of time that energy absorption by the ceramic and reactions with the surrounding atmosphere, which may be of any kind and does not need to be inert, are to a great extent avoided.

It has been discovered, with some surprise, that a very simple bonding of ceramic parts is possible if a thin electrically conducting layer, especially when it is provided in the form of a thin foil or a layer of wires made of an electrically conducting material and connected in circuit as a resistance, is subjected very briefly and suddenly with so much electric current that vaporization of the layer material is produced and also a reaction of that material, for example a metal, with the adjacent ceramic surfaces. The foil or wire seems to explode into vapor but the pressure applied keeps the parts together against the force exerted by the small amount of vapor produced. The delivery of energy should take place so instantaneously that appreciable energy absorption by the ceramic itself is inhibited and extensive reactions with the surrounding atmosphere at high temperatures cannot result. The layer in question, which should be practically indistinguishable as such after the joining process, is made as thin as possible and may be between about 1 $\mu$m and about 50 $\mu$m thick and preferably between about 5 $\mu$m and about 25 $\mu$m.

In accordance with the invention, the electrically conductive layer (typically metal wire or foil or graphite in the shape of a web, a mat, filaments or foil) is connected as a resistance in a circuit and is subjected to a voltage of several kilovolts by means of a capacitor bank. The connections for the current supply can be provided by suitable clamp connectors between which the protruding parts of the foil (or the wire ends) are clamped. Under these circumstances several kiloJoules of energy can be coupled into the layer material. Since the quantity of that material is small, a very rapid heating up takes place during which the material melts, vaporizes, penetrates into the ceramic and reacts with the ceramic. The entire process operates in a few microseconds. Preferably at least a few kilojoules per gram of conductive material are supplied by the capacitor bank in less than 100 microseconds, typically in a time interval of from 1 to 30 um.

The parts to be joined are preferably clamped under the pressure (more or less in the megapascal range) with which the joint seam region is compressed. In proportion to the gravity of the current shock imposed in the median area of the joint remarkably high forces arise which may propagate as a shock wave in the adjacent ceramic material, forces which must be opposed by the clamping force.

The process of the invention is well suited for the bonding of ceramic parts of different kinds, as for example of silicon nitride, silicon carbide, boron carbide, aluminum oxide, etc. For the electrically conducting layer titanium, tantalum, zirconium, hafnium, tungsten or graphite can be provided when carbide or silicide ceramic parts are to be joined. For the bonding together of oxide ceramic parts, a metal foil of magnesium, aluminum or zirconium can be used.

The bonding together of silicon carbide parts with interposition of titanium foil was investigated in particular. For this reason an example of such a joint is further described below.

It can be useful to provide also a precoating of the surfaces to be joined with a reactive or reaction-favoring material, as for example the coating silicon carbide surfaces with a silicon layer (which can be put there by vapor deposition). In that case a graphite foil is desirably interposed between the surfaces so coated and then, according to the invention, the graphite foil is subjected to electric current shock.

The joint produced by current shock, can if desired be subjected to a following heat treatment, by which the strength of the bond can be increased.

BRIEF DESCRIPTION OF THE DRAWINGS

The invention is further described by way of illustrative example with reference to the annexed drawings, in which.

DESCRIPTION OF THE ILLUSTRATED EXAMPLES

Figure 1:
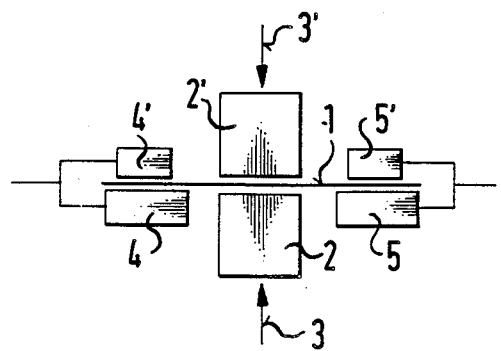
FIG. 1 is a mechanical block diagram showing the use of a metal foil, interposed and clamped between facing surfaces of short, ceramic rods, the foil held in contact with the necessary electric circuit by means of current-connecting clamps.

FIG. 1 shows the foil 1 between the ceramic parts 2 and 2' which are to be joined. These parts are clamped together as shown by the arrows 3 and 3' signifying the applied forces. Portions of the foil 1 protruding from between the parts 2 have contact to them made by clamp connectors 4, 4' and 5, 5' which in turn are connected to the conductors of a current supply.

Figure 2:
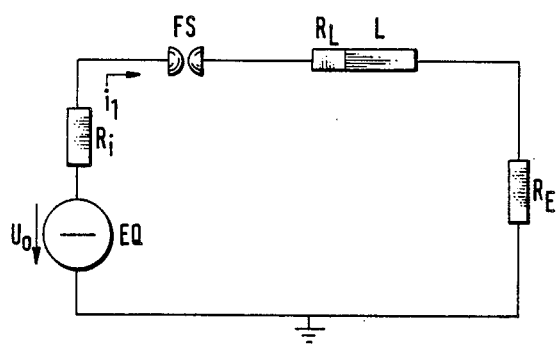
FIG. 2 is a circuit diagram of a circuit for generating the current shock.

The circuit shown in FIG. 2 comprises a direct current source EQ having an output voltage $U_o$ and an internal resistance $R_i$. This DC voltage source is connected over a spark gap SG which serves to generate the current pulse, and through an inductive energy storage unit that may be regarded as having an inductive component L and an ohmic resistance component $R_L$ over to a load or power dissipating resistance $R_E$ which in this case the conducting foil, wire array or conducting mat interposed between ceramic parts that are being pressed together by a clamping force as in FIG. 1.

The inductive energy storage unit L has been used because it can be considered—in the first approximation—as a constant current generator, which in principle would transfer the energy totally to the ohmic resistance without being influenced by changing inductances of the current pulses.

EXAMPLE

In a series of experiments two silicon carbide rods 2, 2′ (in FIG. 1) were in each case provided with polished flat joining surfaces, each of an area of 1.5 cm². A titanium foil of about 5 um thickness was inserted between the polished flat surfaces and the assembly was clamped with a pressure of 2.5 MPa in the manner diagrammed in FIG. 1. The titanium foil was then subjected to a current shock by the application of a voltage from 2.5 to 7.5 kV (peak value) during a period of 1 to 2 microseconds. The output voltage could be 5 to 15 kV. The high voltage was used to provide an initial charge of capacitors having a total capacitance of 4 mF. The circuit had a damping factor of $6.8 \times 10^3$ sec$^{-1}$, an eigenfrequency of $1.9 \times 10^5$ Hz, an inductance of $6.8 \times 10^{-7}$ H and a resistivity of 9.3 mΩ. Joined samples were obtained as the result in each such experiment.

Although the invention has been described with reference to a particular example, it will be understood that variations and modifications are possible within the inventive concept.

It has already been mentioned that the process is applicable to a wide variety of ceramics to be joined with the use of any of a wide variety of interposed metal or graphite layers. If alloys or the like are of sufficient electrical conductivity for rapid development of heat under electric current shock, as is likely if only a small percentage of the total of alloying additives is involved, the use of pure or nearly pure metals or graphite is not necessary. The resistivity of the conducting material is not narrowly critical, because the ceramic materials to be joined are generally nonconducting, so that the electric current is in any event confined to the interposed foil, wire or mat. For an interposed material of relatively lower conductivity more voltage and less capacitance in the circuit is desirable, and vice versa.

We claim:

1. A thermal bonding process for joining ceramic parts which does not require an inert surrounding atmosphere, comprising the steps of:
    cleaning and polishing respective surfaces at which two ceramic parts are to be joined;
    fitting together said parts at said surfaces with insertion of between said surfaces a conducting material in a form selected from the group consisting of foils, wire arrays, webs and mats in each case of a thickness not exceeding 50 μm, said conducting material being selected from the group consisting of graphite and metallic materials;
    connecting said conducting material, by portions thereof accessible in the vicinity of boundaries of said fitted-together surfaces, into an electric circuit for passage of electric current through said conducting material interposed between said surfaces, and
    subjecting said conducting material to electric and thermal shock by passing therethrough an intense pulse of electric current of less than 100 microseconds duration, of such intensity that said conducting material interposed between said surfaces, as well as said surfaces are heated to reactive bonding temperature for said surfaces and of such brevity that said ceramic parts do not absorb enough energy through said surfaces to lower the bonding temperature and reaction of said conducting material with a surrounding atmosphere is likewise inhibited.

2. A process as defined in claim 1, wherein the duration of said electric pulse is not less than 1 μs and not more than 30 μs and the current intensity of said pulse and its duration are such as to release in the form of heat at least 3 kiloJoules of energy per gram of said conducting material interposed between said fitted together surfaces.

3. A process as defined in claim 1, in which said electrically conducting material is a metal and is provided in the form of a metal foil.

4. A process as defined in claim 1, in which said electrically conducting material is a metal and is provided in the form of a wire.

5. A process as defined in claim 1, wherein the thickness of said electrically conducting material interposed between said clean polished surfaces is not less than 1 μm thick nor more than 25 μm thick.

6. A process as defined in claim 1, wherein said ceramic parts are pressed together with a compressive force of at least 1 MPa.

7. A process as defined in claim 1, wherein said ceramic parts are of silicon carbide and said electrically conducting material consists essentially of an element which is capable of forming a carbide, or of forming a silicide, or both in the heat produced when said conducting material is subjected to electric shock.

8. A process as defined in claim 7, wherein said electric conducting material is selected from the group consisting of graphite, titanium, zirconium, hafnium, tantalum and tungsten.

9. A process as defined in claim 1, wherein at least one of said clean and polished surfaces, before being fitted together with the other of said cleaned and polished surfaces, is coated with a reactive or reaction promoting material.

10. A process as defined in claim 9, wherein said ceramic parts are of silicon carbide and said cleaned and polished surfaces thereof are precoated with silicon and said electrically conducting material is graphite in a form selected from the group consisting of foils, webs, mats and fibers.

11. A process as defined in claim 1, wherein following the subjecting of said conducting material to electric and thermal shock by passing an intense pulse of electric current therethrough, a following heat-treatment is provided for improving the joint strength.

* * * * *